US00RE46036E

(19) United States
(12) Reissued Patent
Wu et al.

(10) Patent Number: US RE46,036 E
(45) Date of Reissued Patent: Jun. 21, 2016

(54) METHOD FOR INTEGRATING A MOBILE COMMUNICATION DEVICE AND A PORTABLE ELECTRONIC DEVICE AND PORTABLE COMPUTER MODULE THEREOF

(71) Applicant: Wistron Corporation, New Taipei (TW)

(72) Inventors: Wen-Chin Wu, New Taipei (TW); Tsung-Hsien Tsai, New Taipei (TW); Ming-Hua Hung, New Taipei (TW); Pei-Chen Chin, New Taipei (TW)

(73) Assignee: Wistron Corporation, Hsichih, New Taipei (TW)

(21) Appl. No.: 14/697,609

(22) Filed: Apr. 27, 2015

Related U.S. Patent Documents

Reissue of:
(64) Patent No.: 8,583,174
Issued: Nov. 12, 2013
Appl. No.: 13/462,834
Filed: May 3, 2012

(30) Foreign Application Priority Data

Dec. 7, 2011 (TW) ..... 100144990 A

(51) Int. Cl.
*H04M 1/00* (2006.01)
*G06F 1/16* (2006.01)
*H04M 1/725* (2006.01)

(52) U.S. Cl.
CPC ..... *G06F 1/1626* (2013.01); *G06F 1/1632* (2013.01); *G06F 1/1654* (2013.01); *G06F 1/1677* (2013.01); *G06F 1/1694* (2013.01); *H04M 1/72527* (2013.01)

(58) Field of Classification Search
None
See application file for complete search history.

(56) References Cited

U.S. PATENT DOCUMENTS

| | | | | |
|---|---|---|---|---|
| 6,489,932 | B1 * | 12/2002 | Chitturi et al. | 345/30 |
| 2003/0041206 | A1 * | 2/2003 | Dickie | 710/303 |
| 2010/0250816 | A1 * | 9/2010 | Collopy et al. | 710/303 |
| 2011/0191058 | A1 * | 8/2011 | Nielsen | B65D 83/203 702/130 |

* cited by examiner

*Primary Examiner* — Minh Dieu Nguyen
(74) *Attorney, Agent, or Firm* — Winston Hsu; Scott Margo

(57) ABSTRACT

A method for integrating a mobile communication device and a portable electronic device is disclosed. A protection cover and an electronic-device body of the portable electronic device are pivotally connected for containing the mobile communication device. The mobile communication device is removably and rotatably connected to the electronic-device body. The method includes detecting whether the mobile communication device is coupled to the electronic-device body by the mobile communication device, detecting whether the protection cover is open by the mobile communication device when the mobile communication device detects electrical connection of the mobile communication device to the electronic-device body, detecting whether the mobile communication device is rotated to a position parallel to a horizontal surface to generate a detection result by the mobile communication device when the protection cover is open, and switching the mobile communication device to a touch mode or an image capturing mode according to the detection result.

20 Claims, 6 Drawing Sheets

METHOD FOR INTEGRATING A MOBILE COMMUNICATION DEVICE AND A PORTABLE ELECTRONIC DEVICE AND PORTABLE COMPUTER MODULE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a method for integrating a mobile communication device and a portable electronic device and a portable computer module thereof, and more specifically, to a method of detecting rotation of a mobile communication device to switch the mobile communication device to a touch mode or an image capturing mode and a portable computer module thereof.

2. Description of the Prior Art

With development of technology, a mobile communication device (e.g. a smart phone) has more and more powerful functions. However, limitation of a small screen of the mobile communication device may cause a user much inconvenience in operating the mobile communication device. Thus, the design in which a mobile communication device is integrated into a portable electronic device with a larger display screen has been developed.

In general, a common integration design is to dispose a connection socket for installation of a mobile communication device on a portable computer device (e.g. a tablet computer). Accordingly, when the mobile communication device is installed on the connection socket to be electrically connected to the portable computer device, the portable computer device displays an operation image of the mobile communication device. In such a manner, a user may not only utilize a large display screen of the portable computer device to replace a small screen of the mobile communication device for performing related operations of the mobile communication device more conveniently, but may also utilize the mobile communication device to make the portable computer device have a mobile internet function.

Another common integration design is to utilize a portable docket station without a processing function. The portable docket station may include conventional peripheral components (not including a CPU (Central Processing Unit)), such as a display screen and a keyboard. When the mobile communication device is installed on the portable docket station, the mobile communication device can provide a processing function to form a portable computer device cooperatively with the portable docket station. Thus, the user can utilize a large display screen of the portable docket station to replace a small screen of the mobile communication device for performing related operations of the mobile communication device more conveniently.

However, as mentioned above, the major drawback of the aforesaid integration designs is that functions (e.g. a touch function) of the mobile communication device can not be performed synchronously when the mobile communication device is integrated into the portable computer device or the portable docket station, so as to reduce the performance of the mobile communication device.

SUMMARY OF THE INVENTION

An objective of the present invention is to provide a method of detecting rotation of a mobile communication device to switch the mobile communication device to a touch mode or an image capturing mode and a portable computer module thereof for solving the aforesaid problem.

The present invention provides a method for integrating a mobile communication device and a portable electronic device. The portable electronic device includes an electronic-device body and a protection cover. The protection cover is pivotally connected to the electronic-device body for containing the mobile communication device cooperatively with the electronic-device body. The mobile communication device is removably and rotatably connected to a side of the electronic-device body. The method includes detecting whether the mobile communication device is electrically connected to the electronic-device body by the mobile communication device, detecting whether the protection cover is open by the mobile communication device when the mobile communication device detects electrical connection of the mobile communication device to the electronic-device body, detecting whether the mobile communication device is rotated to a position parallel to a horizontal surface to generate a detection result by the mobile communication device when the mobile communication device detects that the protection cover is open, and switching the mobile communication device to a touch mode or an image capturing mode according to the detection result.

According to the claimed invention, switching the mobile communication device to the touch mode or the image capturing mode according to the detection result includes switching the mobile communication device to the touch mode when the mobile communication device detects rotation of the mobile communication device to the position parallel to the horizontal surface.

According to the claimed invention, switching the mobile communication device to the touch mode or the image capturing mode according to the detection result includes switching the mobile communication device to the image capturing mode when the mobile communication device detects rotation of the mobile communication device to the position unparallel to the horizontal surface.

According to the claimed invention, the method further includes displaying an operation image corresponding to the mobile communication device by the electronic-device body when the mobile communication device detects the electrical connection of the mobile communication device to the electronic-device body and detects that the protection cover is close for covering the mobile communication device in the containing space.

According to the claimed invention, the method further includes switching the mobile communication device to a power saving mode when the mobile communication device detects that the protection cover is close for covering the mobile communication device in the containing space.

According to the claimed invention, the mobile communication device has a display screen and the method further includes activating the display screen by the mobile communication device when the mobile communication device detects that the protection cover is open.

The present invention further provides a portable computer module. The portable computer module includes a portable electronic device and a mobile communication device. The portable electronic device includes an electronic-device body and a protection cover. The electronic-device body has a containing space. The protection cover is pivotally connected to a first side of the containing space for covering the containing space. The mobile communication device is selectively contained in the containing space. The mobile communication device includes a communication-device body, a sensing unit, and an accelerometer. The communication-device body is removably and pivotally connected to a second side of the containing space for detecting whether the communication-device body is electrically connected to the electronic-device body. The sensing unit is electrically connected to and disposed on the communication-device body for detecting whether the protection cover is open when the communication-device body is electrically connected to the electronic-device body. The accelerometer is electrically connected to and disposed on the communication-device body for detecting whether the communication-device body is rotated to a position parallel to a horizontal surface relative to the electronic-device body to generate a detection result when the sensing unit detects that the protection cover is open. The mobile communication device switches to a touch mode or an image capturing mode according to the detection result.

According to the claimed invention, the communication-device body switches to the touch mode when the accelerometer detects that the communication-device body is parallel to the horizontal surface.

According to the claimed invention, the protection cover supports the electronic-device body to stand obliquely at a side of the communication-device body when the communication-device body is parallel to the horizontal surface.

According to the claimed invention, the communication-device body switches to the image capturing mode when the accelerometer detects that the communication-device body is unparallel to the horizontal surface.

According to the claimed invention, when the communication-device body detects that the communication-device body is electrically connected to the electronic-device body and the sensing unit detects that the protection cover is close for covering the communication-device body in the containing space, the electronic-device body displays an operation image corresponding to the communication-device body.

According to the claimed invention, when the sensing unit detects that the protection cover is close for covering the communication-device body in the containing space, the communication-device body switches to a power saving mode.

According to the claimed invention, the communication-device body has a display screen, and the communication-device body activates the display screen when the sensing unit detects that the protection cover is open.

According to the claimed invention, the portable electronic device further includes a rotating shaft and a connection terminal. The rotating shaft is pivotally connected to the second side of the containing space. The connection terminal is disposed on the rotating shaft and electrically connected to the electronic-device body for electrically connecting to the communication-device body, so as to make the communication-device body electrically connected to the electronic-device body and rotatable relative to the electronic-device body via the rotating shaft.

According to the claimed invention, the portable electronic device is a tablet computer, and the mobile communication device is a smart phone.

According to the claimed invention, the portable electronic device is a portable docket station, and the mobile communication device is a smart phone.

In summary, the present invention utilizes the design in which the mobile communication device is pivotally connected to the portable electronic device and the design in which the mobile communication device detects whether to electrically connected to the portable electronic device, whether the protection cover is open, and whether the mobile communication device is parallel to the horizontal surface, to control the mobile communication device to enter the touch mode or the image capturing mode.

In such a manner, the mobile communication device provided by the present invention can be utilized as an input device when being parallel to the horizontal surface, so that the user can perform the related input operations of the portable electronic device or the mobile communication device (e.g. performing a paperwork processing operation or a cursor controlling operation) via the touch function of the mobile communication device. On the other hand, the mobile communication device can be utilized as an image capturing device when being unparallel to the horizontal surface, so that the user can simultaneously utilize the image capturing function of the mobile communication device and the functions of the portable electronic device (e.g. a keyboard simulation function) to perform the video operation of the portable computer module (e.g. holding a video conference).

Thus, the portable computer module provided by the present invention can efficiently solve the problem that the functions (e.g. a touch function or an image capturing function) of the mobile communication device can not be performed synchronously when the mobile communication device is integrated into the portable electronic device, so as to greatly improve the overall performance and operational convenience of the portable computer module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
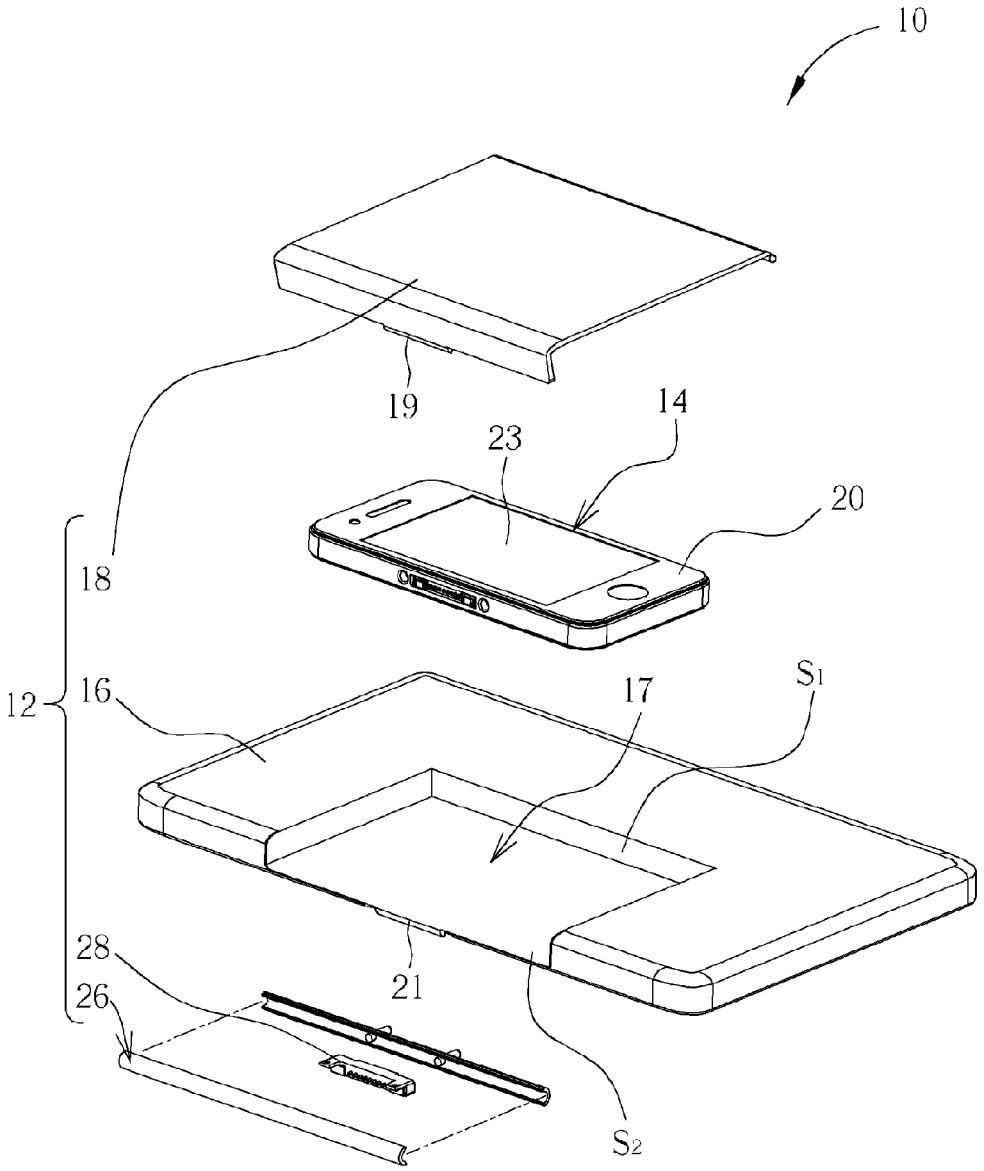
FIG. 1 is an exploded diagram of a portable computer module according to an embodiment of the present invention.
Figure 2:
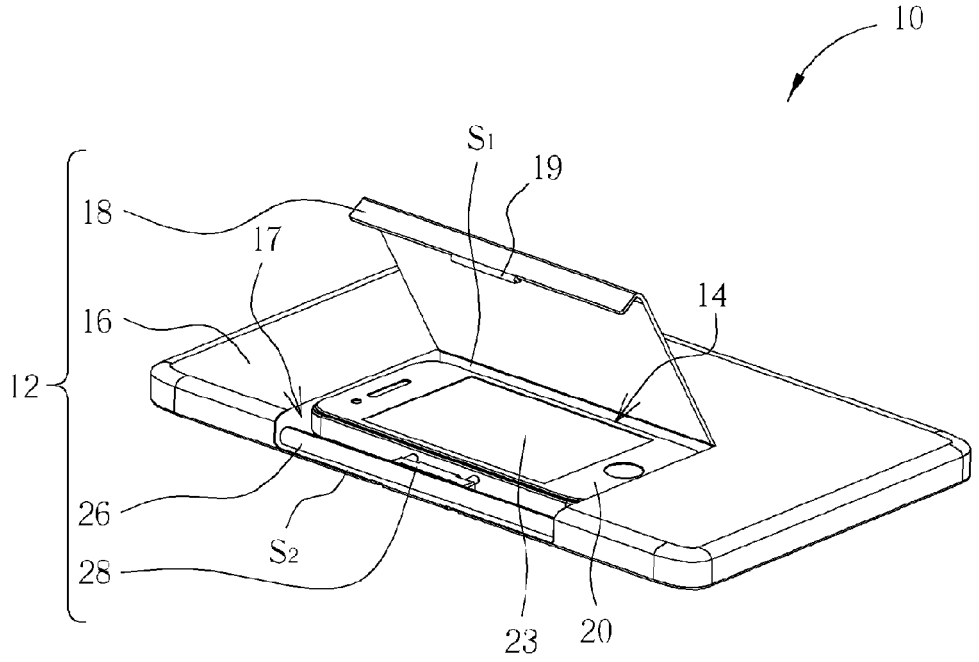
FIG. 2 is an assembly diagram of the portable computer module in FIG. 1.

Please refer to FIG. 1 and FIG. 2, FIG. 1 is an exploded diagram of a portable computer module 10 according to an embodiment of the present invention. FIG. 2 is an assembly diagram of the portable computer module 10 in FIG. 1. As shown in FIG. 1 and FIG. 2, the portable computer module 10 includes a portable electronic device 12 and a mobile communication device 14. In this embodiment, the portable electronic device 12 can be a tablet computer, and the mobile communication device 14 can be a smart phone. The portable electronic device 12 includes an electronic-device body 16 and a protection cover 18. The electronic-device body 16 can be a device with a processing function, including conventional components applied to a portable computer device, such as a central processing unit and a touch display panel.

The electronic-device body 16 has a containing space 17. The protection cover 18 is pivotally connected to a first side $S_1$ of the containing space 17 to cover the containing space 17 for providing fixing, protecting, and dustproof functions when the mobile communication device 14 is disposed in the containing space 17.

As for the fixing design in which the protection cover 18 is utilized to cover the containing space 17, it utilizes a common engaging design. For example, as shown in FIG. 1 (but not limited thereto), the protection cover 18 can have a hook 19, and the electronic-device body 16 can have a corresponding engaging structure 21. Accordingly, when the protection cover 18 rotates relative to the electronic-device body 16 to cover the containing space 17, the protection cover 18 can be fixed onto the electronic-device body 16 by engagement of the hook 19 and the engaging structure 21.

Figure 3:
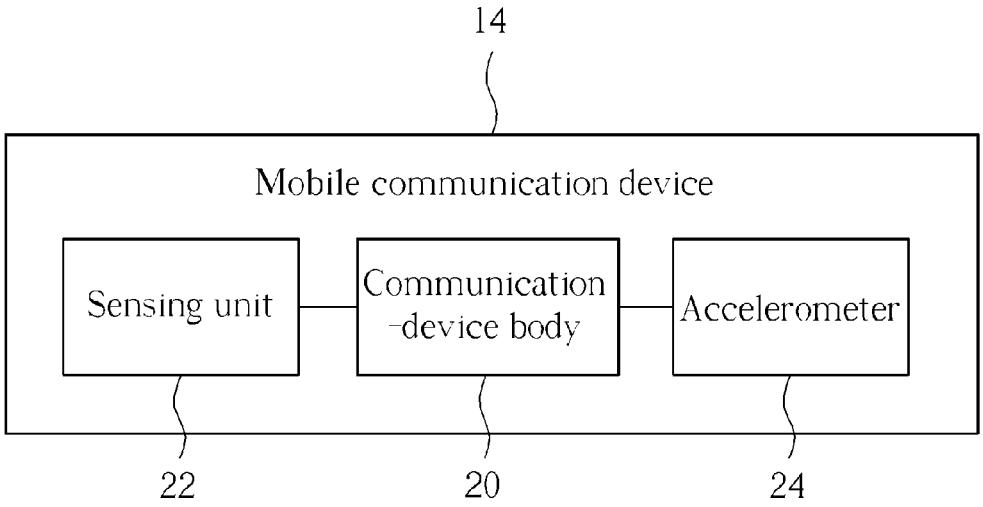
FIG. 3 is a functional block diagram of a mobile communication device in FIG. 2.

Please refer to FIG. 3, which is a functional block diagram of the mobile communication device 14 in FIG. 2. The mobile communication device 14 is selectively contained in the containing space 17. To more specific, the mobile communication device 14 can be contained in the containing space 17 so that the portable computer module 10 can be utilized as a conventional portable computer. On the other hand, the mobile communication device 14 can be rotated off the containing space 17 to be selectively utilized as an input device of the portable electronic device 12 when the mobile communication device 14 is parallel to a horizontal surface, or to be utilized as an image capturing device of the portable electronic device 12 when the mobile communication device 14 is unparallel to the horizontal surface. Accordingly, a user can perform input operations (e.g. a paperwork processing operation or a cursor controlling operation) of the portable electronic device 12 via the touch function provided by the mobile communication device 14, or can simultaneously utilize the image capturing function of the mobile communication device 14 and the functions of the portable electronic device 12 (e.g. a keyboard simulation function) to perform video operations of the portable computer module 10 (e.g. holding a video conference).

The mobile communication device 14 includes a communication-device body 20, a sensing unit 22, and an accelerometer 24. The communication-device body 20 can be removably and pivotally connected to a second side $S_2$ of the containing space 17 and has a display screen 23. The communication-device body 20 is used for detecting whether to be electrically connected to the electronic-device body 16. The sensing unit 22 is electrically connected to and disposed on the communication-device body 20. The sensing unit 22 can be a light sensor or a hall sensor for detecting whether the protection cover 18 is open when the mobile communication-device body 20 is electrically connected to the electronic-device body 16. The accelerometer 24 is electrically connected to and disposed on the communication-device body 20. When the sensing unit 22 detects that the protection cover 18 is open, the accelerometer 24 is used for detecting whether the communication-device body 20 is rotated relative to the electronic-device body 16 to a position parallel to the horizontal surface (substantially parallel to the ground surface) to generate a detection result. Accordingly, the communication-device body 20 can switch to a touch mode or an image capturing mode according to the aforesaid detection result. The accelerometer 24 can be a conventional sensing device having a tilt sensing function, such as a gravity sensor, a gyroscope, or the combination.

As mentioned above, the communication-device body 20 can be removably and pivotally connected to the second side $S_2$ of the containing space 17. More detailed description for the pivotal connection design of the electronic-device body 16 and the communication-device body 20 is provided as follows. As shown in FIG. 1 and FIG. 2, in this embodiment, the portable electronic device 12 can further include a rotating shaft 26 and a connecting terminal 28. The rotating shall 26 is pivotally connected to the second side $S_2$ of the containing space 17. In this embodiment, the rotating shaft 26 can be a conventional pivot structure, such as a hinge. Accordingly, when the communication-device body 20 is rotated relative to the electronic-device body 16 via the rotating shaft 26, the rotating shaft 26 can utilize torsion provided by itself to position an angle of the communication-device body 20 relative to the electronic-device body 16, so that the portable computer module 10 can have a stepless angle adjusting function. The connecting terminal 28 is disposed on the rotating shaft 26 and electrically connected to the electronic-device body 16. The connecting terminal 28 can be a conventional connecting device, such as a pogo pin, for electrically connecting to the communication-device body 20. In such a manner, the communication-device body 20 can be electrically connected to the electronic-device body 16 via the connecting terminal 28 and rotatable relative to the electronic-device body 16 via the rotating shaft 26 (as shown in FIG. 2).

Figure 4:
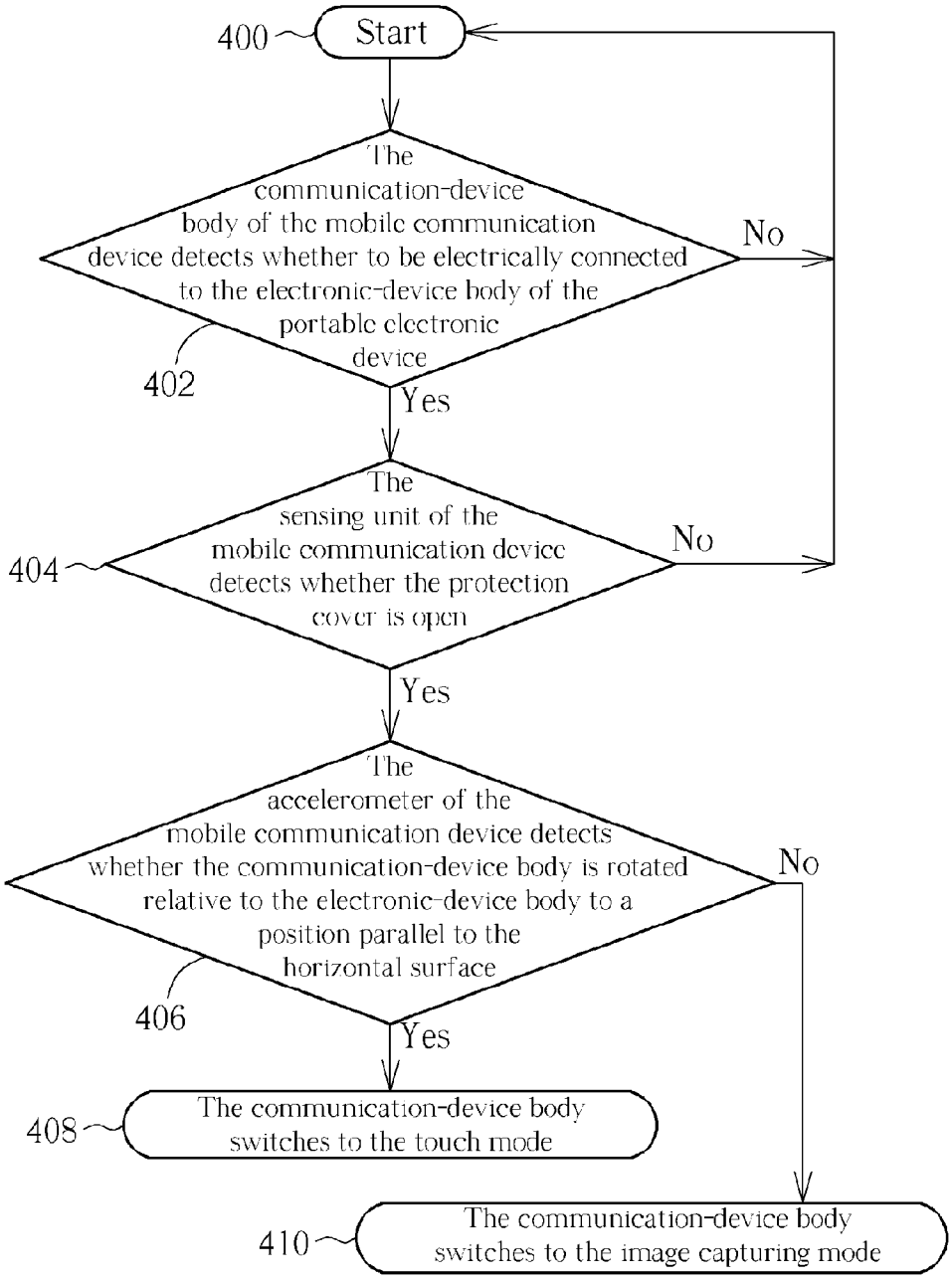
FIG. 4 is a flowchart of a method of integrating a portable electronic device and the mobile communication device according to the present invention.

Please refer to FIG. 4, which is a flowchart of a method of integrating the portable electronic device 12 and the mobile communication device 14 according to an embodiment of the present invention. The method includes the following steps.

Step 400: Start;

Step 402: The communication-device body 20 detects whether to be electrically connected to the electronic-device body 16; if so, go to Step 404; if not, go to Step 400;

Step 404: The sensing unit 22 detects whether the protection cover 18 is open; if so, go to Step 406; if not, go to Step 400;

Step 406: The accelerometer 24 detects whether the communication-device body 20 is rotated relative to the electronic-device body 16 to a position parallel to the horizontal surface; if so, go to Step 408; if not, go to Step 410;

Step 408: The communication-device body 20 switches to the touch mode;

Step 410: The communication-device body 20 switches to the image capturing mode.

The aforesaid steps are described in details as follows. At first, when a user contains the mobile communication device 14 in the containing space 17 and closes the protection cover 18 to utilize the portable electronic module 10 as a conventional portable computer, the communication-device body 20 can detect whether to be electrically connected to the electronic-device body 16 via the connecting terminal (Step 402). Whether the communication-device body 20 is electrically connected to the electronic-device body 16 can be determined by detecting whether pins of the connecting terminal 28 are electrically connected to the electronic-device body 16. If the communication-device body 20 detects no electrical connection to the electronic-device body 16, the portable computer module 10 performs Step 400 and keeps monitoring the electrical connection condition between the communication-device body 20 and the electronic-device body 16.

On the other hand, if the communication-device body 20 detects its electrical connection to the electronic-device body 16, the sensing unit 22 detects whether the protection cover 18 is open (Step 404), to determine whether the user opens the protection cover 18 to operate the mobile communication device 14. As mentioned above, the sensing unit 22 can be a light sensor or a hall sensor. That is to say, the sensing unit 22 can detect whether the protection cover 18 is open in a light sensing manner or a magnetic induction manner. For example, if the sensing unit 22 is a light sensor, the sensing unit 22 can determine that the protection cover 18 is in a close state for containing the mobile communication device 14 in the containing space 17 when the intensity of light sensed by the sensing unit 22 is less than a specific value. On the contrary, the sensing unit 22 can determine that the protection cover 18 is in an open state when the intensity of light sensed by the sensing unit 22 is greater than the specific value. As for the related descriptions for the light sensor and the hall sensor, they are commonly seen in the prior art and therefore omitted herein.

Via the said sensing design, if the sensing unit 22 detects that protection cover 18 is close, the portable computer module 10 performs Step 400 and keeps utilizing the sensing unit 22 to detect whether the protection cover 18 is in the close state. To be noted, in this embodiment, when the communication-device body 20 detects its electrical connection to the electronic-device body 16 and the sensing unit 22 detects that the protection cover 18 is close for containing the communication-device body 20 in the containing space 17, the user can operate the electronic-device body 16 to display an operation image corresponding to the communication-device body 20 via a large display screen of the electronic-device body 16 instead of the display screen 23 of the communication-device body 20, so that the user can operate the mobile communication device 14 more conveniently. Furthermore, the communication-device body 20 can further switch to a power-saving mode (e.g. turning off the touch function of the communication-device body 20 or turning off the display screen 23) for achieving the power-saving purpose when the sensing unit 22 detects that the protection cover 18 is close.

On the other hand, if the sensing unit 22 detects that the protection cover 18 is open, it represents that the user has already opened the protection cover 18. At this time, the accelerometer 24 detects whether the communication-device body 20 is rotated relative to the electronic-device body 16 to the position parallel to the horizontal surface (Step 406). To be noted, if the communication-device body 20 is in the power-saving mode, the communication-device body 20 can activate the display screen 23 after detecting that the protection cover 18 is open, so that the user can operate the mobile communication device 14 conveniently.

Figure 5:
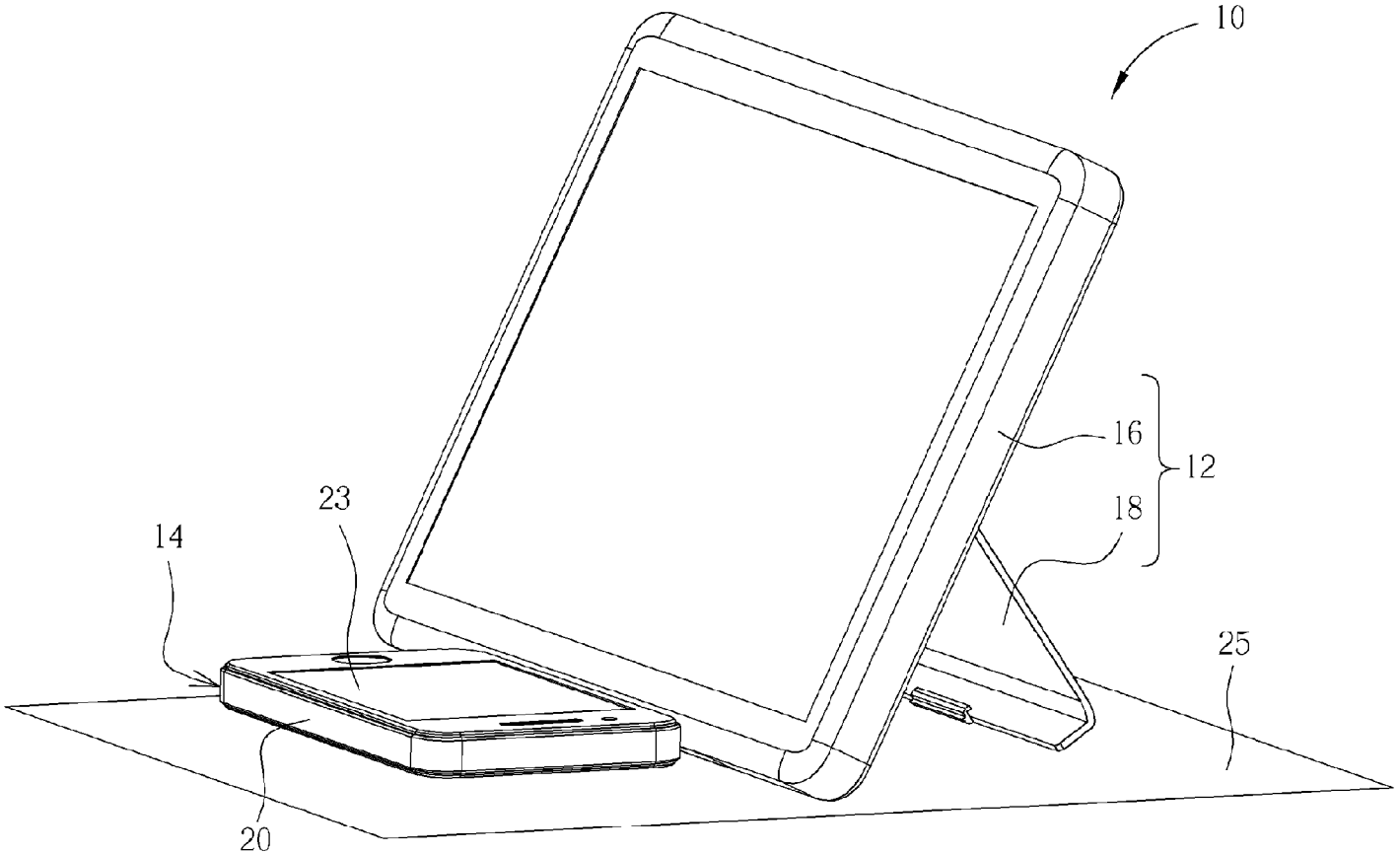
FIG. 5 is a diagram of a protection cover in FIG. 2 supporting an electronic-device body on a holding surface.

When the user rotates the communication-device body 20 to be parallel to the horizontal surface, the accelerometer 24 can accordingly generate a corresponding detection result, and then the communication-device body 20 enters the touch mode (Step 408) according to the detection result. Accordingly, the communication-device body 20 can be utilized as an input device of the portable electronic device 12 for the user to perform a paperwork inputting operation or a cursor controlling operation. For improving convenience of the portable computer module 10 in use, when the communication-device body 20 is parallel to the horizontal surface, the protection cover 18 can be further used for supporting the electronic-device body 16 on a holding surface 25 so that the electronic-device body 16 can stand obliquely at a side of the communication-device body 20 (as shown in FIG. 5). Thus, the user can feel like operating a desktop computer or a notebook, so that the user can operate the portable electronic device 12 (e.g. performing a paperwork inputting operation or a cursor controlling operation) more conveniently via the touch function provided by the mobile communication device 14.

Figure 6:
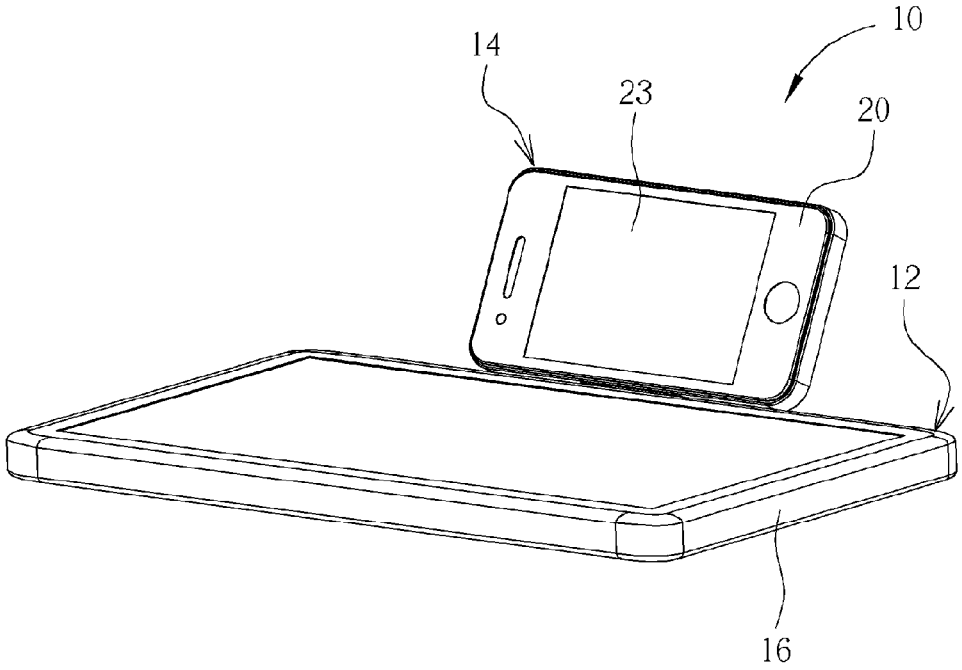
FIG. 6 is a diagram of the communication-device body in FIG. 5 rotating to a position unparallel to a horizontal surface.

On the other hand, please refer to FIG. 6, which is a diagram of the communication-device body 20 in FIG. 5 rotating to a position unparallel to the horizontal surface. When the user rotates the communication-device body 20 to be unparallel to the horizontal surface, the accelerometer 24 can generate a corresponding detection result, and then the communication-device body 20 enters the image capturing mode (Step 410) according to the detection result. Accordingly, the communication-device body 20 can be utilized as an image capturing device of the portable electronic device 12. That is, the user can simultaneously utilize the image capturing function of the mobile communication device 14 and the functions of the portable electronic device 12 (e.g. a keyboard simulation function) to perform the video operation of the portable computer module 10 (e.g. holding a video conference).

To be noted, the portable electronic device 12 is not limited to a portable computer device with a processing function (e.g. a tablet computer) mentioned in the aforesaid embodiment. That is, the portable electronic device 12 can also be a portable docket station without a processing function, meaning that the electronic-device body 16 can only include conventional peripheral components (not including a central processing unit) applied to a portable computer, such as a touch screen.

In this embodiment, when the mobile communication device 14 is installed on the portable electronic device 12 (i.e. the portable docket station), the communication-device body can provide a processing function to form a portable computer device cooperatively with the portable electronic device 12. In such a manner, when the communication-device body 20 is parallel to the horizontal surface, the communication-device body 20 enters the touch mode accordingly to be utilized as an input device and then controls the electronic-device body 16 to display an operation image corresponding to the communication-device body 20 via a large display screen of the electronic-device body 16 instead of the display screen 23 of the communication-device body 20, so that the user can operate the mobile communication device 14 more conveniently.

On the other hand, when the communication-device body 20 is unparallel to the horizontal surface, the communication-device body 20 enters the image capturing mode accordingly to be utilized as an image capturing device. In such a manner, the user can simultaneously utilize the image capturing function of the mobile communication device 14 and the functions of the portable electronic device 12 (e.g. a keyboard simulation function) to perform the video operations of the portable computer module 10 (e.g. holding a video conference). As for the related description, it can be reasoned according to the aforesaid embodiment and therefore omitted herein.

Compared with the prior art, the present invention utilizes the design in which the mobile communication device is pivotally connected to the portable electronic device and the design in which the mobile communication device detects whether to electrically connected to the portable electronic device, whether the protection cover is open, and whether the mobile communication device is parallel to the horizontal surface, to control the mobile communication device to enter the touch mode or the image capturing mode.

In such a manner, the mobile communication device provided by the present invention can be utilized as an input device when being parallel to the horizontal surface, so that the user can perform the related input operations of the portable electronic device or the mobile communication device (e.g. performing a paperwork processing operation or a cursor controlling operation) via the touch function of the mobile communication device. On the other hand, the mobile communication device can be utilized as an image capturing device when being unparallel to the horizontal surface, so that the user can simultaneously utilize the image capturing function of the mobile communication device and the functions of the portable electronic device (e.g. a keyboard simulation function) to perform the video operations of the portable computer module (e.g. holding a video conference).

Thus, the portable computer module provided by the present invention can efficiently solve the problem that the functions (e.g. a touch function or an image capturing function) of the mobile communication device can not be performed synchronously when the mobile communication device is integrated into the portable electronic device, so as to greatly improve the overall performance and operational convenience of the portable computer module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for integrating a mobile communication device and a portable electronic device, the portable electronic device comprising an electronic-device body and a protection cover, the protection cover being pivotally connected to the electronic-device body for containing the mobile communication device cooperatively with the electronic-device body, the mobile communication device removably and rotatably connected to a side of the electronic-device body, the method comprising:

detecting whether the mobile communication device is electrically connected to the electronic-device body [by the mobile communication device];

detecting whether the protection cover is open by the mobile communication device when the mobile communication device detects electrical connection [of the mobile communication device] to the electronic-device body; *and*

*when the protection cover is open,* detecting whether the mobile communication device is rotated *relative to the portable electronic device* to a *first* position [parallel to a horizontal surface to generate a detection result by the mobile communication device when the mobile communication device detects that the protection cover is open; and switching the mobile communication device to a touch mode or an image capturing mode according to the detection result] *switching the mobile communication device to a first operation mode or a second position switching the mobile communication device to a second operation mode.*

2. The method of claim 1, wherein [switching the mobile communication device to the touch mode or the image capturing mode according to the detection result] *the first operation mode is a touch mode, and detecting whether the mobile communication device is rotated relative to the portable electronic device to the first position switching the mobile communication device to the first operation mode or the second position switching the mobile communication device to the second operation mode* comprises:

switching the mobile communication device to the touch mode when the mobile communication device detects rotation of the mobile communication device to the *first* position parallel to [the] *a* horizontal surface.

3. The method of claim 1, wherein [switching the mobile communication device to the touch mode or the image capturing mode according to the detection result] *the second operation mode is an image capturing mode, and detecting whether the mobile communication device is rotated relative to the portable electronic device to the first position switching the mobile communication device to the first operation mode or the second position switching the mobile communication device to the second operation mode* comprises:

switching the mobile communication device to the image capturing mode when the mobile communication device detects rotation of the mobile communication device to [a] *the second* position unparallel to [the] *a* horizontal surface.

4. The method of claim 1 further comprising:

displaying an operation image corresponding to the mobile communication device by the electronic-device body when the mobile communication device detects the electrical connection [of the mobile communication device] to the electronic-device body and detects that the protection cover is close for covering the mobile communication device in the containing space.

5. The method of claim 1 further comprising:

switching the mobile communication device to a power saving mode when the mobile communication device detects that the protection cover is close for covering the mobile communication device in the containing space.

6. The method of claim 1, wherein the mobile communication device has a display screen and the method further comprises:

activating the display screen by the mobile communication device when the mobile communication device detects that the protection cover is open.

7. A portable computer module comprising:

a portable electronic device comprising:

an electronic-device body having a containing space; and a protection cover pivotally connected to a first side of the containing space for covering the containing space; and a mobile communication device selectively contained in the containing space, the mobile communication device comprising:

a communication-device body removably and pivotally connected to a second side of the containing space for detecting whether the communication-device body is electrically connected to the electronic-device body;

a sensing unit electrically connected to and disposed on the communication-device body for detecting whether the protection cover is open when the communication-device body is electrically connected to the electronic-device body; and an accelerometer electrically connected to and disposed on the communication-device body for detecting whether the communication-device body is rotated *relative to the portable electronic device* to a *first* position [parallel to a horizontal surface relative to the electronic-device body to generate a detection result] *switching the mobile communication device to a first operation mode or a second position switching the mobile communication device to a second operation mode* when the sensing unit detects that the protection cover is open;

wherein the mobile communication device switches to a touch mode or an image capturing mode according to the detection result.

8. The portable computer module of claim 7, wherein *the first operation mode is a touch mode, and* the communication-device body switches to the touch mode when the accelerometer detects that the communication-device body is parallel to [the] *a* horizontal surface.

9. The portable computer module of claim 8, wherein the protection cover supports the electronic-device body to stand obliquely at a side of the communication-device body when the communication-device body is parallel to the horizontal surface.

10. The portable computer module of claim 7, wherein *the second operation mode is an image capturing mode, and* the communication-device body switches to the image capturing mode when the accelerometer detects that the communication-device body is unparallel to [the] *a* horizontal surface.

11. The portable computer module of claim 7, wherein when the communication-device body detects that the communication-device body is electrically connected to the electronic-device body and the sensing unit detects that the protection cover is close for covering the communication-device body in the containing space, the electronic-device body displays an operation image corresponding to the communication-device body.

12. The portable computer module of claim 8, wherein when the communication-device body detects that the communication-device body is electrically connected to the electronic-device body and the sensing unit detects that the protection cover is close for covering the communication-device body in the containing space, the electronic-device body displays an operation image corresponding to the communication-device body.

13. The portable computer module of claim 10, wherein when the communication-device body detects that the communication-device body is electrically connected to the electronic-device body and the sensing unit detects that the protection cover is close for covering the communication-device body in the containing space, the electronic-device body displays an operation image corresponding to the communication-device body.

14. The portable computer module of claim 7, wherein when the sensing unit detects that the protection cover is close for covering the communication-device body in the containing space, the communication-device body switches to a power saving mode.

15. The portable computer module of claim 7, wherein the communication-device body has a display screen, and the communication-device body activates the display screen when the sensing unit detects that the protection cover is open.

16. The portable computer module of claim 7, wherein the portable electronic device further comprises:

a rotating shaft pivotally connected to the second side of the containing space; and a connection terminal disposed on the rotating shaft and electrically connected to the electronic-device body for electrically connecting to the communication-device body, so as to make the communication-device body electrically connected to the electronic-device body and rotatable relative to the electronic-device body via the rotating shaft.

17. The portable computer module of claim 8, wherein the portable electronic device further comprises:

a rotating shaft pivotally connected to the second side of the containing space; and a connection terminal disposed on the rotating shaft and electrically connected to the electronic-device body for electrically connecting to the communication-device body, so as to make the communication-device body electrically connected to the electronic-device body and rotatable relative to the electronic-device body via the rotating shaft.

18. The portable computer module of claim 10, wherein the portable electronic device further comprises:

a rotating shaft pivotally connected to the second side of the containing space; and a connection terminal disposed on the rotating shaft and electrically connected to the electronic-device body for electrically connecting to the communication-device body, so as to make the communication-device body electrically connected to the electronic-device body and rotatable relative to the electronic-device body via the rotating shaft.

19. The portable computer module of claim 7, wherein the portable electronic device is a tablet computer, and the mobile communication device is a smart phone.

20. The portable computer module of claim 7, wherein the portable electronic device is a portable docket station, and the mobile communication device is a smart phone.

* * * * *